United States Patent
Hu et al.

(10) Patent No.: US 8,804,563 B2
(45) Date of Patent: Aug. 12, 2014

(54) APPARATUS AND METHOD FOR CHANNEL ESTIMATION IN A WIRELESS COMMUNICATIONS SYSTEM

(75) Inventors: Yang Hu, Beijing (CN); Jianfeng Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 123 days.

(21) Appl. No.: 13/513,574

(22) PCT Filed: Dec. 4, 2009

(86) PCT No.: PCT/CN2009/001367
§ 371 (c)(1),
(2), (4) Date: Jun. 2, 2012

(87) PCT Pub. No.: WO2011/066671
PCT Pub. Date: Jun. 9, 2011

(65) Prior Publication Data
US 2012/0236752 A1    Sep. 20, 2012

(51) Int. Cl.
*H04L 12/26*    (2006.01)

(52) U.S. Cl.
USPC ............................................. 370/252

(58) Field of Classification Search
CPC ............ H04L 25/022; H04L 25/0228
USPC .......................................... 370/252
See application file for complete search history.

(56) References Cited

U.S. PATENT DOCUMENTS

| 2007/0116138 A1* | 5/2007 | Tsai et al. ...................... 375/260 |
| 2008/0159214 A1 | 7/2008 | Majonen et al. |
| 2009/0067539 A1* | 3/2009 | Maltsev et al. ................ 375/296 |
| 2009/0116581 A1* | 5/2009 | Liau ............................... 375/296 |
| 2009/0274250 A1* | 11/2009 | Li .................................. 375/344 |
| 2010/0223522 A1* | 9/2010 | Duggan ......................... 714/748 |
| 2010/0304687 A1* | 12/2010 | Azadet et al. .............. 455/67.16 |
| 2011/0032839 A1* | 2/2011 | Chen et al. .................... 370/252 |
| 2011/0080969 A1* | 4/2011 | Jongren et al. ................ 375/267 |
| 2011/0305161 A1* | 12/2011 | Ekpenyong et al. .......... 370/252 |
| 2012/0147984 A1* | 6/2012 | Bjerke et al. .................. 375/285 |
| 2013/0003883 A1* | 1/2013 | Fujishima et al. ............ 375/260 |
| 2013/0259147 A1* | 10/2013 | Wang et al. ................... 375/260 |

FOREIGN PATENT DOCUMENTS

| CN | 101330486 A | 12/2008 |
| CN | 101399589 A | 4/2009 |

* cited by examiner

*Primary Examiner* — Asad Nawaz
*Assistant Examiner* — Syed S Ali
(74) *Attorney, Agent, or Firm* — Murphy, Bilak & Homiller, PLLC

(57) ABSTRACT

The exemplary embodiments of the present invention relate to a user equipment and to a method for channel estimation in a wireless communications network system. The method comprises: receiving physical resource blocks from a radio base station; estimating a channel coefficient of each received physical resource block; calculating for each two adjacent physical resource blocks, a difference between estimated channel coefficients of the two adjacent physical resource blocks; comparing each difference with a predefined threshold value; grouping physical resource blocks for which said difference is less than or equal to the predefined threshold value; and performing a group-wise channel estimation and per physical resource block channel adaptively.

11 Claims, 11 Drawing Sheets

Table 1

|  | Codebook based precoding | Non-codebook based precoding |
|---|---|---|
| Common RS (CRS) | Wideband CRS:<br>- Channel measurement (CQI/RI/PMI)<br>- Channel demodulation | Wideband CRS:<br>- Channel measurement (CQI) |
| Dedicated RS (DRS) | Not carried | DRS in allocated PRB:<br>- the same precoder as data<br>- Channel demodulation |

Figure 1

APPARATUS AND METHOD FOR CHANNEL ESTIMATION IN A WIRELESS COMMUNICATIONS SYSTEM

TECHNICAL FIELD

The present invention relates generally to the field of wireless communications systems, and, more specifically, to an apparatus and a method for channel estimation in wireless communications system.

BACKGROUND

The 3rd Generation Partnership Project (3GPP) is responsible for the standardization of the UMTS (Universal Mobile Telecommunication Service) system and LTE (Long Term Evolution) is currently under discussion as a next generation mobile communication system of the UMTS system. LTE is a technology for realizing high-speed packet-based communication that can reach high data rates both in the downlink and in the uplink. The 3GPP work on LTE is also referred to as E-UTRAN (Evolved Universal Terrestrial Access Network). Thus work is ongoing in 3GPP to specify an evolution to UTRAN, denoted E-UTRA, as part of the LTE effort. The first release of LTE, referred to as release-8 (Rel-8) can provide peak rates of 300 Mbps, a radio-network delay of e.g. 5 ms or less, a significant increase in spectrum efficiency and a network architecture designed to simplify network operation, reduce cost, etc. In order to support high data rates, LTE allows for a system bandwidth of up to 20 MHz. LTE is also able to operate in different frequency bands and can operate in at least FDD (Frequency Division Duplex) and TDD (Time Division Duplex). The modulation technique or the transmission scheme used in LTE is known as OFDM (Orthogonal Frequency Division Multiplexing).

For the next generation mobile communications system e.g. IMT-advanced (International Mobile Telecommunications) and/or LTE-advanced, which is an evolution of LTE, support for bandwidths of up to 100 MHz is being discussed. One issue with such wide bandwidth is that it is challenging to find free 100 MHz of contiguous spectrum, due to that radio spectrum is a limited resource.

LTE-advanced can be viewed as a future release of the LTE standard and since it is an evolution of LTE, backward compatibility is important so that LTE-advanced can be deployed in spectrum already occupied by LTE. This means that for an LTE user equipment or a LTE terminal, a LTE-advanced capable network can appear as a LTE network. In both LTE and LTE-advanced radio base stations known as eNBs or eNodeBs—where e stands for evolved—, multiple antennas with beamforming technology can be adopted in order to provide high data rates to user equipments. Thus, LTE and LTE-advanced are an example of MIMO (Multiple-Input, Multiple-Output) radio systems. Another example of a MIMO based system is WiMAX (Worldwide Interoperability for Microwave Access) system.

In MIMO based systems, beamforming or precoding is used for supporting multi-layer transmissions. Precoding involves among other features, focusing the power and direction of transmit antennas to improve the perceived SNR (Signal to Noise Ratio) or the perceived SINR (Signal to Interference and Noise Ratio) and thus improving the performance and throughput in the system. Precoding can be categorized as codebook and non-codebook based precoding. Codebook based precoding, which maybe used for LTE FDD, has been introduced in order to minimize the feedback overhead which can be significant without careful design of the feedback link (i.e. uplink) from a user equipment to a radio base station. A codebook is a predetermined set of precoding matrices wherein each precoding matrix is identified by a PMI (precoding matrix index (or indicator)). Therefore, when a user equipment requests the establishment of a channel or a connection with a radio base station, the user equipment estimates the quality of the channel and instead of feeding back a complete channel matrix to the radio base station, the user equipment only selects and sends back the index of the most suitable precoding matrix out of a codebook. This way, the feedback overhead is reduced.

For non-codebook based precoding (or beamforming), the radio base station is not constrained to select precoding matrix(ces) from a predefined set of precoding matrices, but can instead exploit channel reciprocity to adjust the downlink transmission weights from channel estimates obtained from uplink transmissions. Examples of uplink transmissions include user equipment DRS (dedicated reference signal(s)) also used for fast data demodulation besides wideband CRS (common reference signal(s)) for channel measurement. Since DRS is/are dedicated per user equipment, DRS is/are carried in allocated/assigned physical resource block (PRBs) assigned by the radio base station to the user equipment. Furthermore, in contrast to codebook-based precoding, in case of non-codebook based precoding, the user equipment makes estimation of the overall beamformed channel. To enable this, LTE e.g. provides the possibility for the transmission of user equipment reference symbols, being transmitted using the same beam-forming as the user data, and allowing for the user equipment to estimate the overall beam-formed channel. Another aspect of this is that the number of transmit antennas used for non-codebook based precoding is not constrained by the number of available cell-specific reference signals.

It should be mentioned that in a codebook-based precoding system, wideband CRS is also used for data demodulation together with the PMI informed by the radio base station via downlink control signalling. Therefore, the user equipment has different demodulation strategies depending on the precoding scheme. A comparison between two kinds of precoding for CRS respectively DRS and associated reporting indexes/indicators such as RI (Rank Indicator); PMI and CQI (Channel Quality Indicator) are shown in Table 1 of FIG. 1. Note that DRS is not carried when codebook based precoding is used.

As mentioned earlier, for non-codebook based precoding, channel estimation is performed based on DRS in the allocated PRBs. However, due to that the user equipment lacks knowledge on precoding granularity, the easiest strategy is to perform per-PBR channel estimation, which is also applied in current standardization evaluations. FIG. 2 is an example depicting a conventional strategy on channel estimation for non-codebook based precoding. As shown, each subframe, according to the scheduling strategy of the radio base station (here denoted eNB as an example), includes PRBs (6 PRBs are shown per subframe) and each PRB is subject to a downlink precoder (beamforming) denoted $W_i$ and each subframe has different precoding granularity. As an example, PRB #1 of subframe 1 is subject to downlink precoder $W_1$, PRB #2 and PRB #3 of the same subframe #1 are instead subject to downlink precoder $W_2$; PRB #1 and PRB#2 of subframe #2 are subject to precoder $W_1$ whereas PRB #3 and PRB #4 of subframe #2 are subject to precoder $W_2$ etc. The channel estimation strategy applied by the user equipment (UE) is, as shown, performed per-PRB. Subframes, as shown scheduled in the time and frequency domain.

Referring to FIGS. 3A-3B, there are illustrated the performance evaluations (i.e. simulations) when per-PRB channel estimation is performed for dual-layer beamforming under two ETU (Extended Typical Urban) scenarios, the first one (FIG. 3A) where the speed of the UE is 3 km/h, and the second one (FIG. 3B) where the speed of the UE i 120 km/h. The performance of ideal channel estimations is also depicted for the two scenarios. The legends in respective graph indicate which curves relate to ideal channel estimations and which curves relate to realistic channel estimation for a ETU scenario. The simulations show the BLER (BLock Error Rate) as a function of the SNR (in dB). Throughout the simulations, precoding granularity of 4 PRBs is used. Furthermore, the UE:s channel estimator used is based on the criterion of the minimum mean square error (MMSE) using a 2 dimensional-MMSE filter (2D-MMSE). In addition, 3 modulations schemes are considered: QPSK (Quadrature Phase Shift Keying), 16 QAM (Quadrature Amplitude Modulation) and 64 QAM; and the same coding rate equal to ½ is applied for all modulations schemes. As shown, regardless of the ETU scenario the gap between ideal channel estimation and per-PRB realistic channel estimation is large. The gaps are encircled in FIGS. 3A-3B. The higher the modulation scheme and the higher the mobility or speed of the user equipment, the larger the gap. This is because higher modulation e.g. 64 QAM is more sensitive to channel errors. As an example, with reference to FIG. 3A where the speed is 3 km/h one can see that for 64 QAM, the BLER is approximately 20% when the SNR is equal to 13 dB for an ideal channel. For the same 64 QAM and for the same SNR value, the BLER is approximately 45% for a realistic channel. With reference to FIG. 3B where the speed is 120 km/h one can see that for 64 QAM, the BLER is approximately 50% when the SNR is equal to 13 dB for an ideal channel. For the same 64 QAM and for the same SNR value, the BLER is approximately 90% for a realistic channel.

Thus, the drawback of adopting conventional channel estimation schemes is that the demodulation performance of beamforming and the performance of the system in general are far away from ideal performance, especially for higher modulation schemes.

SUMMARY

An object of the exemplary embodiments of the present invention is thus to address the above mentioned problem by providing a method and an apparatus in the form of a user equipment (UE) or user terminal, for channel estimation that improves the performance and channel estimation accuracy in a wireless communications system supporting beamforming.

According to an aspect of exemplary embodiments of the present invention, the above stated problem is solved by means of. a UE for channel estimation in a wireless communications network system, the UE comprising a receiver circuit configured to receive a plurality of PRBs from a radio base station. The UE further comprises a channel estimator configured to estimate a channel coefficient of each PRB; a calculator circuit configured to calculate for each two adjacent PRBs, a difference between estimated channel coefficients of the two adjacent PRBs; a comparator circuit configured to compare each calculated difference with a predefined threshold value; an assembler circuit configured to group PRBs for which the calculated difference is less than or equal to the predefined threshold value; and the channel estimator is further configured to perform a group-wise channel estimation on a group comprising PRBs (i.e. group-wise or inter PRB channel estimation) for which said calculated difference is less than or equal to the predefined threshold and to further perform per-PRB channel estimation on each remaining PRB.

According to another aspect of exemplary embodiments of the present invention, the above stated problem is solved by means of a method in a UE, for channel estimation in a wireless communications network system. The method comprising: receiving a plurality of consecutive PRBs from a radio base station; estimating a channel coefficient of each received PRB; calculating for each two adjacent PRBs, a difference between estimated channel coefficients of the two adjacent PRBs; comparing each difference with a predefined threshold value; grouping PRBs for which the difference is less than or equal to the predefined threshold value; performing a group-wise channel estimation on a group comprising PRBs for which said difference is less than the predefined threshold value and to performing per-PRB estimation on each remaining PRB.

An advantage of the exemplary embodiments of the present invention is to improve the channel estimating accuracy.

Another advantage of the exemplary embodiments of the present invention is to improve the performance of the wireless communications system.

Yet another advantage of the exemplary embodiments of the present invention is to achieve a low-complexity implementation of channel estimation strategy at the UE.

A further advantage of the exemplary embodiments of the present invention is achieve an adaptive switch between channel estimation strategies without any control signalling informed by the radio base station to the UE.

Still other advantages, objects and features of the exemplary embodiments of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims.

BRIEF DESCRIPTION OF THE DRAWINGS

FIG. 1 is a table depicting two kinds of precoding schemes and associated demodulation/channel measurement strategies.

DETAILED DESCRIPTION

Figure 2:
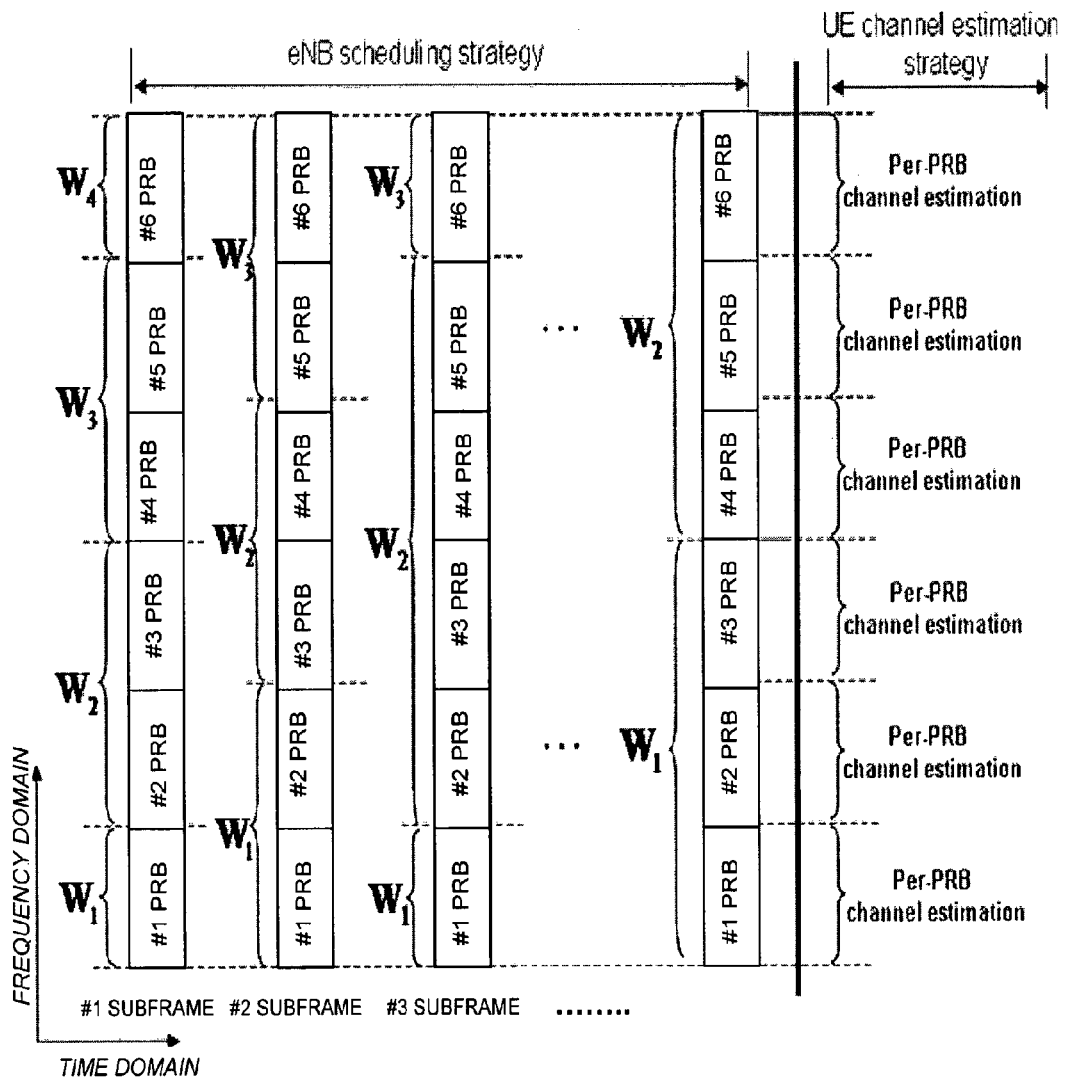
FIG. 2 illustrates a prior radio base station scheduling strategy and a prior art UE channel estimation strategy.
Figure 3A:
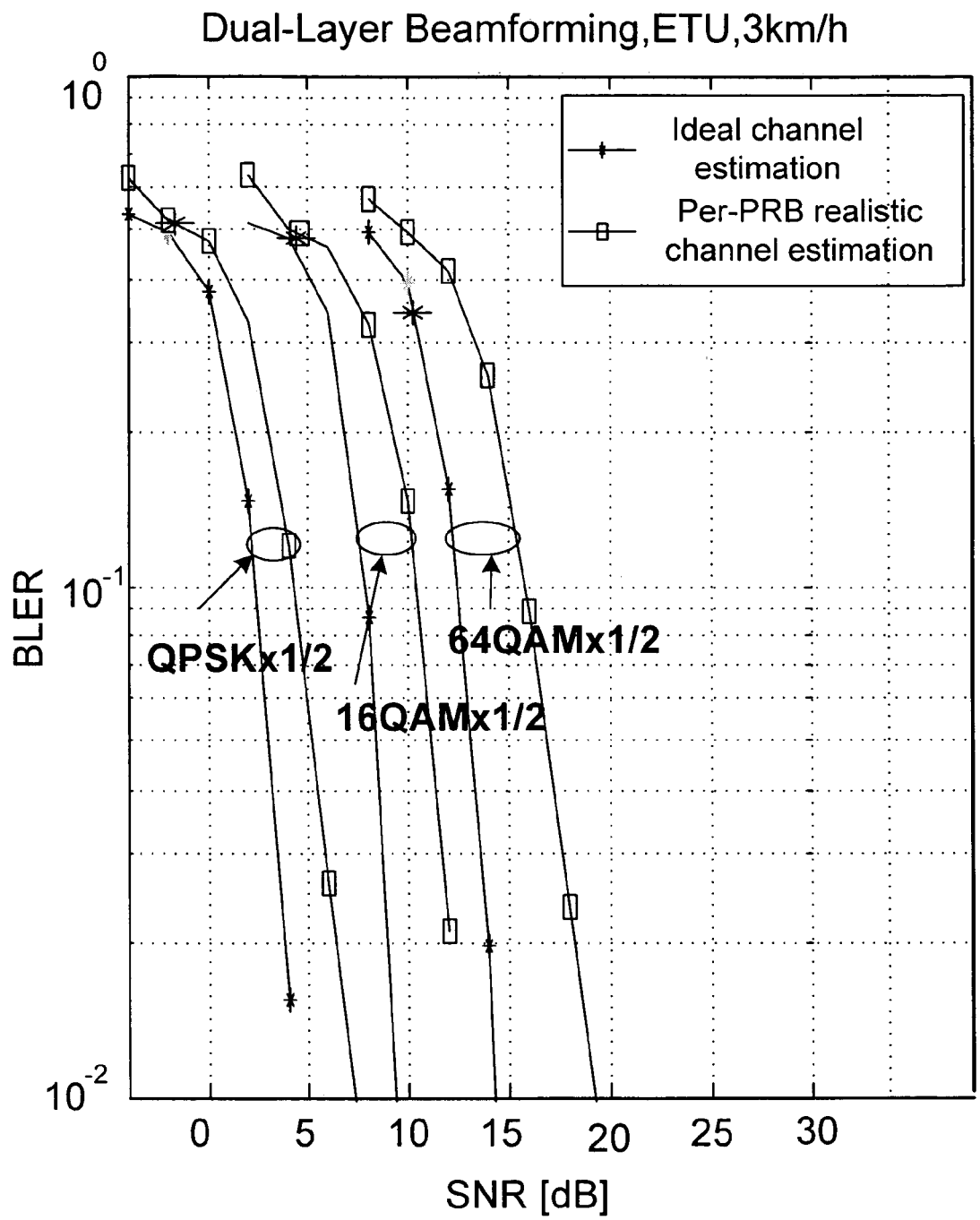
FIG. 3A illustrates a prior art performance comparison between ideal channel estimation and per-PRB channel estimation in a first scenario.
Figure 3B:
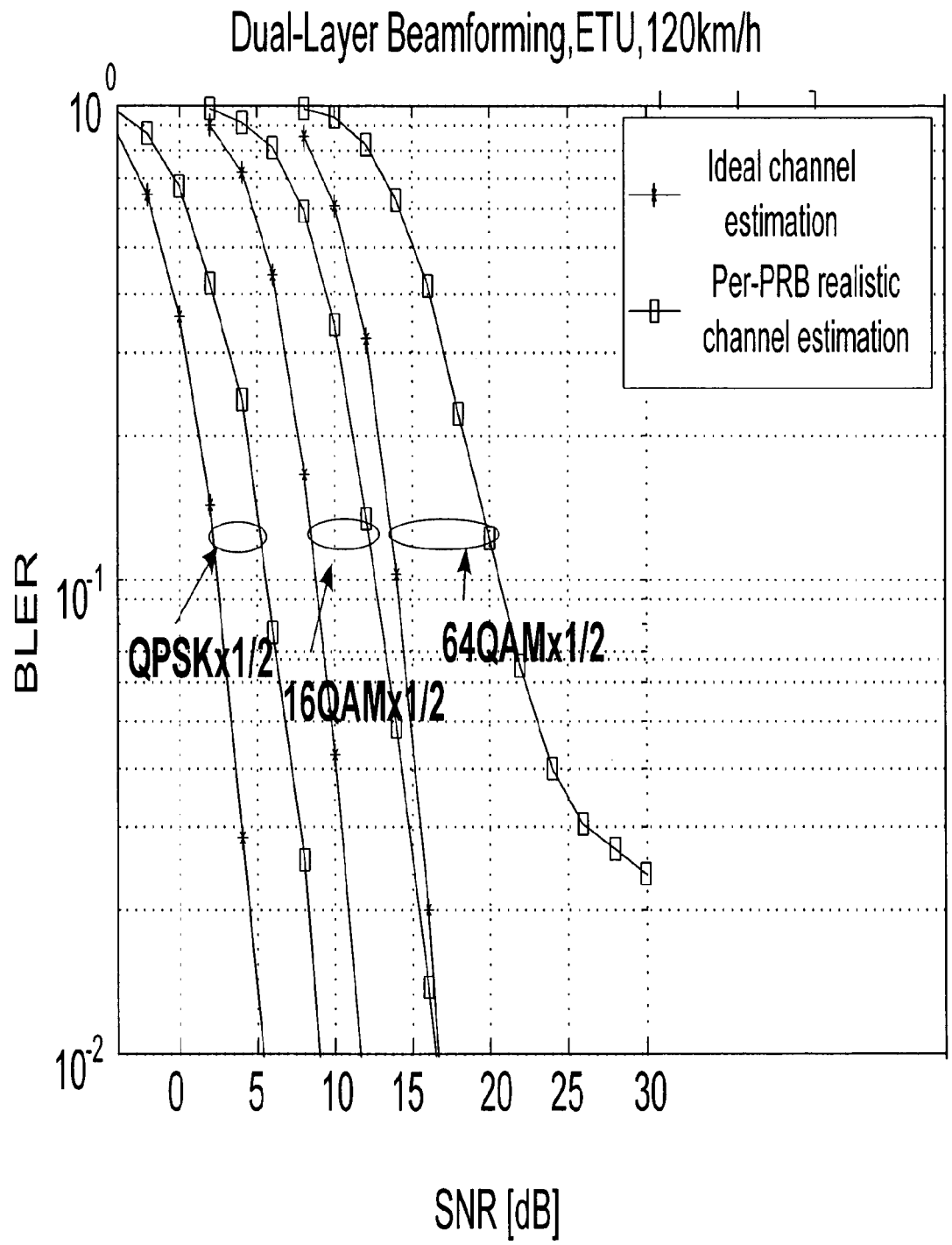
FIG. 3B illustrates a prior art performance comparison between ideal channel estimation and per-PRB channel estimation in a second scenario.

In the following description, for purposes of explanation and not limitation, specific details are set forth such as particular architectures, scenarios, techniques, etc. in order to provide thorough understanding of the present invention. However, the present invention and its embodiments may be practiced in other embodiments that depart from these specific details.

The exemplary embodiments of the present invention are described herein by way of reference to particular example network systems. In particular the invention is described in a non-limiting general context in relation to a wideband system wherein LTE-based (LTE and/or LTE-advanced) radio base stations i.e. eNodeBs (or eNBs) and UEs are configured to support precoding (i.e. beamforming). It should be noted that the present invention and its exemplary embodiments may also be applied to other types of radio network technologies and architectures employing radio base stations and UEs deployed therein and supporting beamforming (i.e. precoding).

The exemplary embodiments of the present invention relate to a UE configured to perform channel estimation based on physical resource blocks (PRB) received form a radio base station (e.g. eNB of LTE) that is adapted to support precoding i.e. beamforming. The eNB can be viewed as a MIMO based eNB and therefore the eNB supports multi-layer transmissions i.e. a plurality of transmission modes. The eNB supports non-codebook based precoding and is therefore not constrained to select precoding matrix(ces) from a predefined set of precoding matrices, but can instead exploit channel reciprocity to adjust the downlink transmission weights from channel estimates obtained from uplink transmissions. Examples of uplink transmissions include UE DRS (dedicated reference signal(s)) also used for fast data demodulation besides wideband CRS (common reference signal(s)) for channel measurement. Since DRS is/are dedicated per UE, DRS is/are carried in PRBs assigned by the eNB to the UE. Note however that the eNB can also support codebook based precoding using a predetermined set of precoding matrices. It should also be noted that in LTE release 8, single layer beamforming is supported with single-port DRS for demodulation and in LTE release 9, up to two layers transmission is supported with dual ports DRS for demodulation. Nevertheless, the exemplary embodiments of the invention are not restricted to LTE and are not restricted to any specific numbers of MIMO antennas at the radio base station side or at the UE side.

In the following description it is considered the exemplary case where at least non-codebook based precoding is supported by the radio base station which is configured to schedule resources to a UE for enabling the UE to communicate with the radio base station. The scheduler at the radio base station is adapted to assign or allocate a plurality of consecutive subframes comprising PRBs which are considered here to be consecutive. The scheduler may apply any suitable scheduling strategy being dynamic or static. The assignment is informed through downlink transmissions towards the UE. The radio base station is, as mentioned above, a MIMO base radio base station. For this, the radio base station includes a plurality or transceivers making use of precoder(s) to apply beamforming. The UE may also be configured to support MIMO by incorporating several antennas and precoder(s) for beamforming and for permitting communication with the radio base station in the uplink direction. When the UE receives signals (data or control) from the radio base station, the UE is configured to perform channel estimations on received signal(s) and to report back to the radio base station in order for the radio base station to have knowledge of the communication channel through which the signals propagate.

Figure 4:
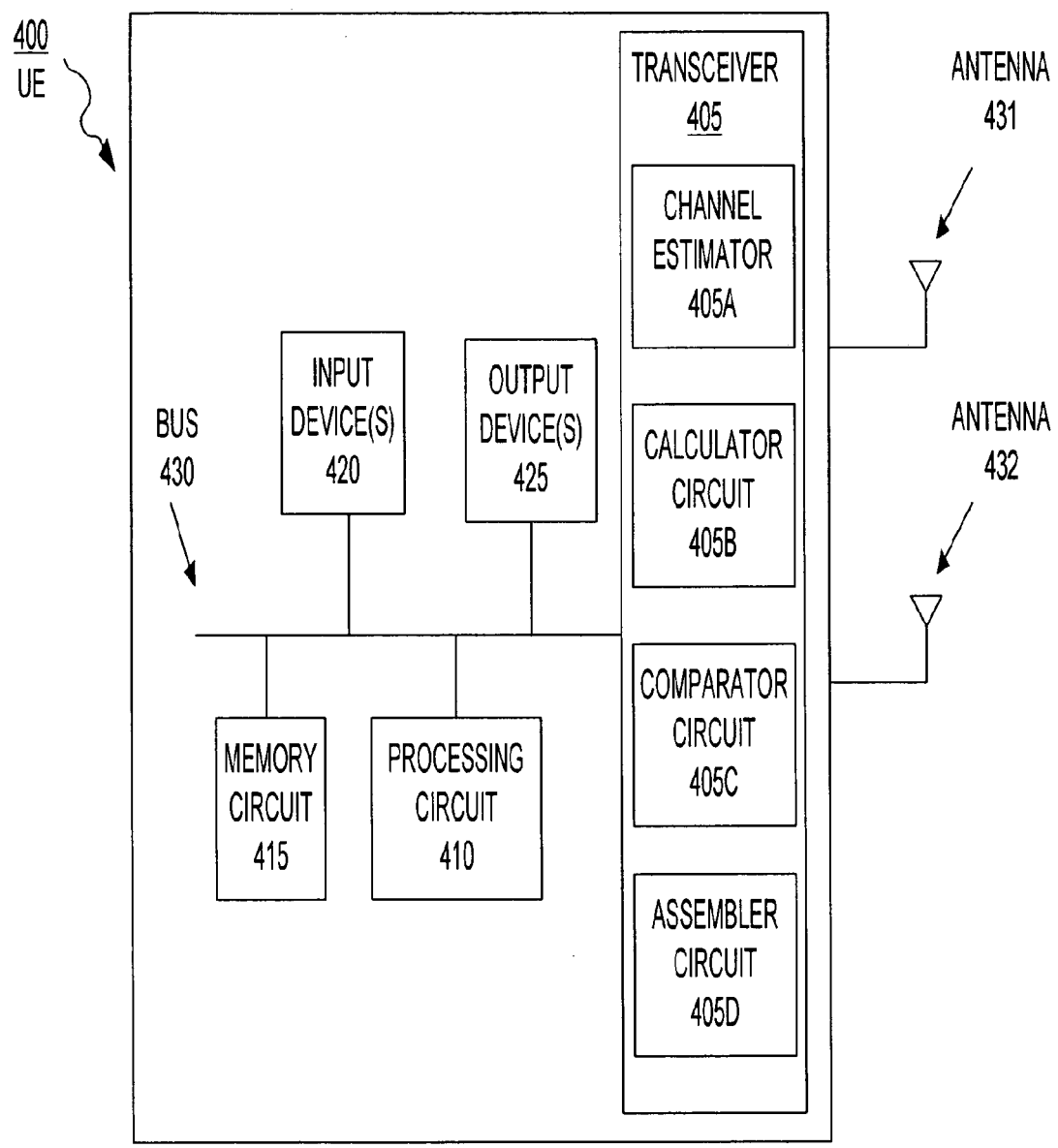
FIG. 4 is a block diagram illustrating a user equipment according to exemplary embodiments of the present invention

Referring to FIG. 4 there is illustrated a block diagram depicting a UE 400 according to some exemplary embodiments of the present invention. The UE 400 is shown comprising two antennas 431, 432 (although not necessary), connected to a receiver/transmitter (also known as transceiver) 405 which is connected via a bus 430 to input devices 420; output devices 425, a memory 415 and a processing circuit 410. Antennas 431, 432 may include one or more antennas to transmit and/or receive radio frequency (RF) signals over the air. Antennas 431, 432 may, for example, receive RF signals from transceiver 405 and transmit the RF signals over the air to a radio base station (not shown) and receive RF signals over the air from the radio base station and provide the RF signals to transceiver 405. Antennas 431, 432 in combination with transceiver 405 are therefore configured to receive via at least antenna 431 and/or antenna 432, as previously described, assigned/allocated PRBs. The transceiver 405 in this case acts as a receiver.

According to an exemplary embodiment of the present invention, the UE 400 is configured to perform channel estimation based on the received PRBs. For this, the UE 400 comprises a channel estimator 405A (e.g. a channel estimator circuit) configured to estimate, for each received PRB, a channel coefficient, denoted here $H_k$ where k=1, 2, 3, 4, . . . denotes the PRB index. In other words, the channel estimator 405A is adapted to perform a channel estimation per-PRB. The UE 400 may store estimated channel coefficients in memory (or memory circuit) 415.

For each two adjacent PRBs, a calculator circuit 405B is adapted to calculate the difference between channel coefficients of the two adjacent PRBS. The difference is given by: $\Delta_k = |H_{k+1} - H_k|^2$, k=1, 2, 3, 4, . . . where | | denoted the absolute value operator.

As an example, for four received PRBs the channel estimator 405A is configured to determine: $H_1$ denoting an estimated channel coefficient of PRB#1; $H_2$ denoting an estimated channel coefficient of PRB#2 which is adjacent to PRB#1; $H_3$ denoting an estimated channel coefficient of PRB#3 which is adjacent to PRB#2; and $H_4$ denoting an estimated channel coefficient of PRB#4 which is adjacent to PRB#3. The calculator circuit 405B is then configured to determine differences $\Delta_1 = |H_2 - H_1|_2$; $\Delta_2 = |H_3 - H_2|^2$ and $\Delta_3 = |H_4 - H_3|^2$. The UE 400 further comprises a comparator circuit 405C configured to compare each difference $\Delta_k = |H_{k+1} - H_k|^2$ with a predefined or predetermined threshold value denoted $T_h$. After comparison, the UE 400 is further configured by means of an assembler circuit 405D to perform an assembling or a grouping procedure of PRBs for which the calculated difference is less than or equal to the predefined threshold value $T_h$ according to the following:

When $\Delta_k \leq T_h$, the k-th and the (k+1)-th PRB are grouped in one two elements group.

When $\Delta_k > T_h$, the k-th PRB is not grouped or is a one element group.

Similar operations of other PRBs.

PRBs can be grouped in frequency domain and/or in time domain. The PRBs can thus be distributed into different groups according to at least one criterion. According to an exemplary embodiment of the present invention, one useful criterion is to investigate if continuity of channel state information (CSI) between adjacent PRBs is maintained by comparing with a predefined CSI threshold $T_h$. In other words, the PRBs having continuous CSI in frequency and/or time domain are grouped, otherwise they are distributed. This can be viewed as a continuity criterion based on a predefined CSI threshold value. Note that the predefined threshold value $T_h$ is a design parameter that can be determined based on system or network requirements through simulations or evaluations. In other words the exemplary embodiments of the present invention are not by any way restricted to any particular value of the threshold $T_h$. Note also that the exemplary embodiments of the present invention are not restricted to CSI. As an example, the criterion could be to investigate if the difference of estimated channel coefficient corresponding to estimated SNRs fulfill a predetermined SNR threshold value; or to investigate if the difference of estimated channel coefficient corresponding to estimated SINRs fulfill a predetermined SINR threshold value; or to investigate if the difference of estimated channel coefficient corresponding to estimated RSSI (received signal strength indicator) fulfill a predetermined RSSI threshold value or to investigate if the difference of estimated channel coefficient corresponding to estimated BLERs fulfill a predetermined BLER threshold value or to investigate if the difference of estimated channel coefficient corresponding to any estimated performance related channel coefficients fulfill a predefined threshold value. An advantage of using a continuity criterion as described above is that it provides a low complexity implementation in the UE 400.

After comparing and grouping of PRBs, the UE 400 is configured, by means of the channel estimator 405A to perform group-wise channel estimation on each group of PRBs for which the calculated difference of estimated channel coefficients of PRBs of the group is less than or equal to the predefined threshold value. The channel estimator 405A is further configured to perform a per PRB channel estimation on each remaining PRB. This way an adaptive channel estimation strategy is achieved since according to the exemplary embodiments of the present invention, the UE 400 can adaptively switch between group-wise PRB channel estimation, denoted also inter-PRB channel estimation, and per-PRB channel estimation, and this is performed without involving any control signalling from the radio base station. Note that the different blocks of the transceiver 405 are not necessarily within transceiver block 405 i.e. they could be incorporated in a processor or processing circuit or in any suitable component or circuit or circuit of the UE hardware wise and/or software wise.

Figure 5:
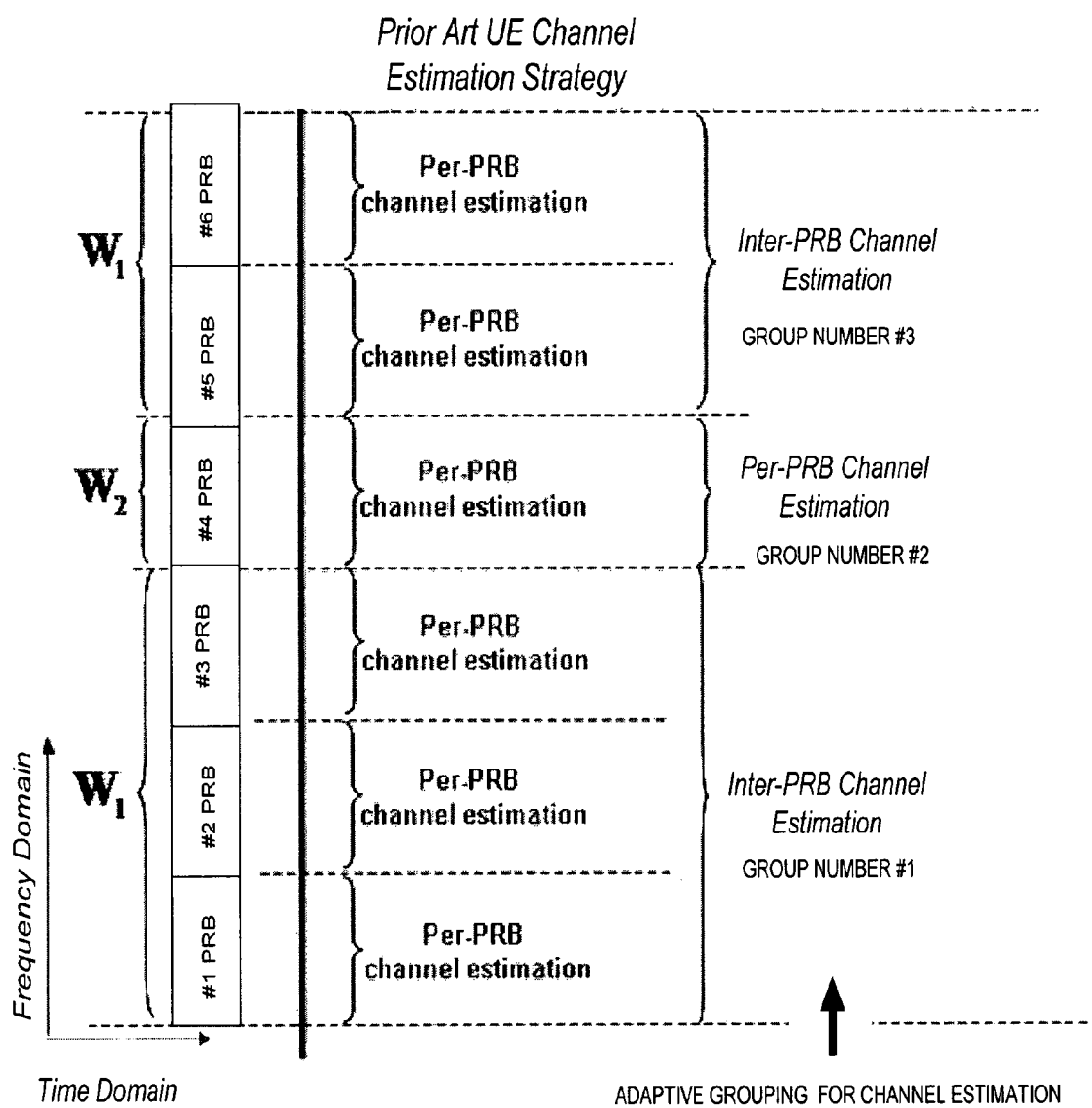
FIG. 5 illustrates prior art UE channel estimation strategy vs. UE channel estimation strategy according to an exemplary embodiment of the present invention.

Referring to FIG. 5 there is illustrated an example of channel estimation strategy of the prior art versus adaptive channel estimation strategy a performed according to the above described exemplary embodiment of the present invention. As shown, the prior art channel estimation strategy is performed per-PRB whereas the channel estimation strategy according to an exemplary embodiment of the present invention is performed, as described earlier, by adaptive grouping for channel estimation i.e. adaptive between per-PRB and inter-PRB channel estimation. Note that in FIG. 5 only 6 PRBs are taken into consideration although this is not necessary.

Figure 6:
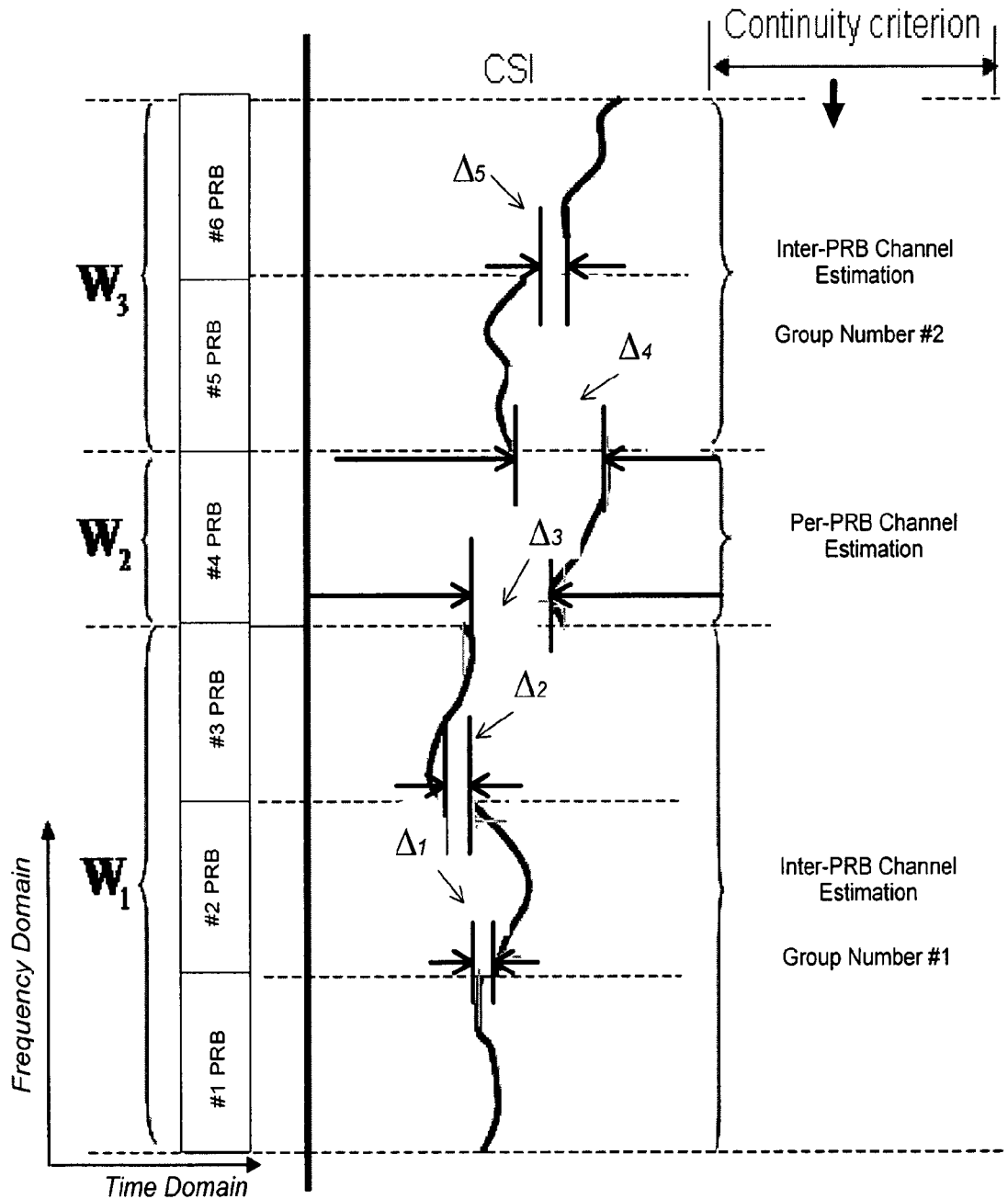
FIG. 6 illustrates an example of channel estimation strategy based on an exemplary continuity criterion according to an exemplary embodiment of the present invention.

As mentioned earlier, the criterion can be based on that the continuity of CSI between adjacent several PRBs is maintained. These is done by distributing the PRBs into one group and perform inter-PRB channel estimation, otherwise, per-PRB channel estimation is performed. Referring to FIG. 6 there is illustrated an example of the continuity criterion wherein 6 PRBs are considered. As previously described $\Delta_k$ denotes the calculated difference between estimated channel coefficient of PRB# k+1 ($H_{k+1}$) and of PRB #k ($H_k$) i.e. $\Delta_k = |H_{k+1} - H_k|^2$. In FIG. 6, differences $\Delta_1$; $\Delta_2$; $\Delta_3$; $\Delta_4$ and $\Delta_5$ are depicted. Each difference $\Delta_k$ is compared with a predefined CSI threshold value to decide if the CSI between adjacent PRBs is continuous, and grouping is performed prior to channel estimation. As shown, group #1 comprises PRBs 1,2,3; and group #2 comprises PRBs 5 and 6 and thus inter-PRB channel estimation is performed for group 1 and group 2, whereas PRB #4 is subject to a per-PRB channel estimation. It should be mentioned that group size can be limited to a reasonable number of PRBs in order to reduce implementation complexity. This is because maybe less gain can be obtained as the group size increases too much. A suitable group size can e.g. comprise of a maximum of 6 PRBs. Note however, that the exemplary embodiments of the present invention are not restricted to only 6 PRBs.

Figure 7:
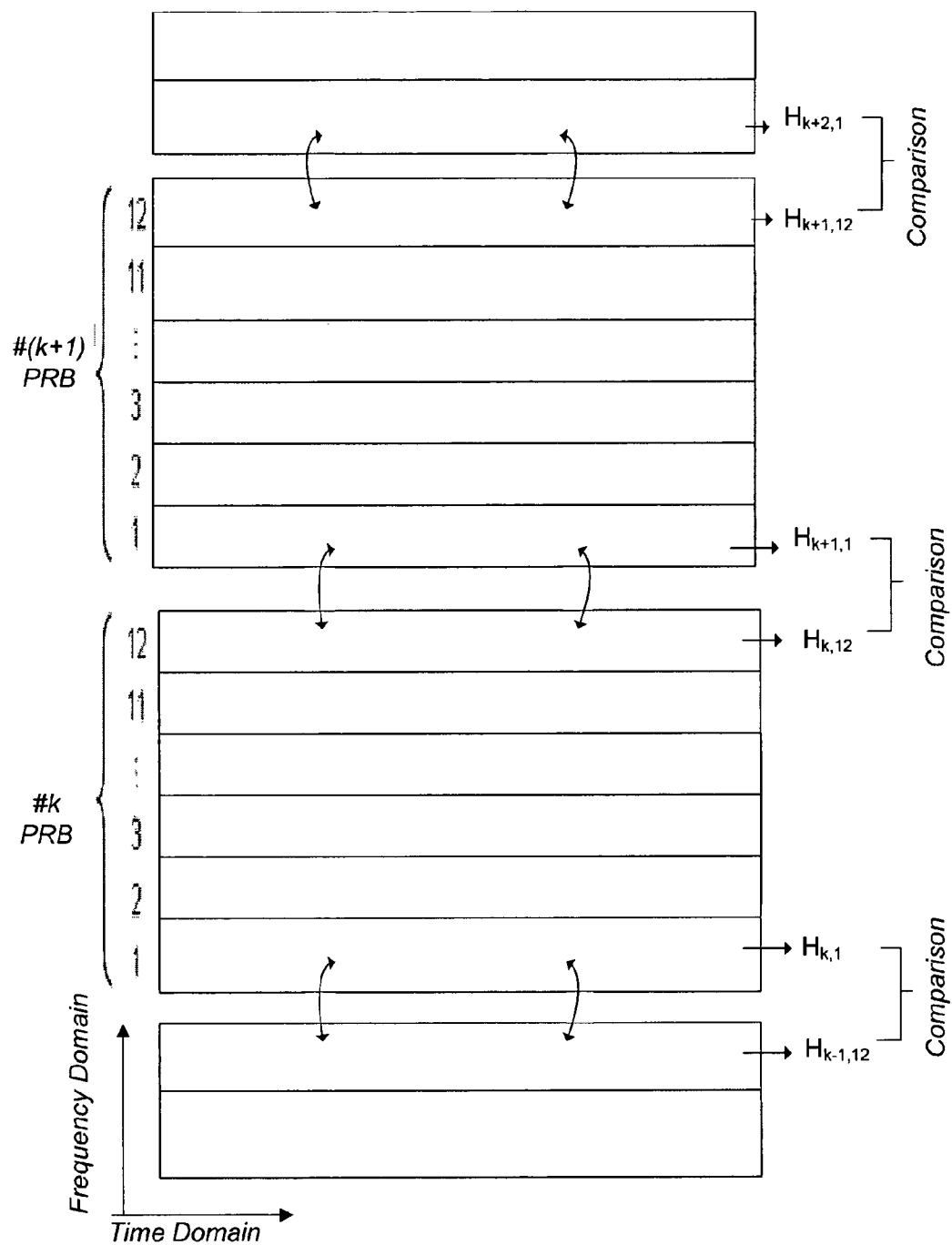
FIG. 7 illustrates comparison of exemplary channel coefficients at band edges for channel estimation according to an exemplary embodiment of the present invention.

As mentioned above, low-complexity implementation maybe achieved by the exemplary embodiments of the present invention. Referring to FIG. 7 there is illustrated how low-complexity implementation can be achieved according to an exemplary embodiments of the present invention. As shown, only the difference of channel coefficients estimated at band edges are considered. Each PRB is shown comprising 12 sub-elements indexed 1, 2, 3 . . . , 12. For PRB #k, channel coefficients at band edges separating consecutives PRBs #k and PRB #k+1 and PRBs #k and PRB #k−1 respectively are estimated and denoted $H_{k,1}$ and $H_{k,12}$. For PRB #k+1, channel coefficients at band edges are estimated i.e. $H_{k+1,1}$ and $H_{k+1,12}$.

The arrows in FIG. 7 indicate band edges.

Figure 8A:
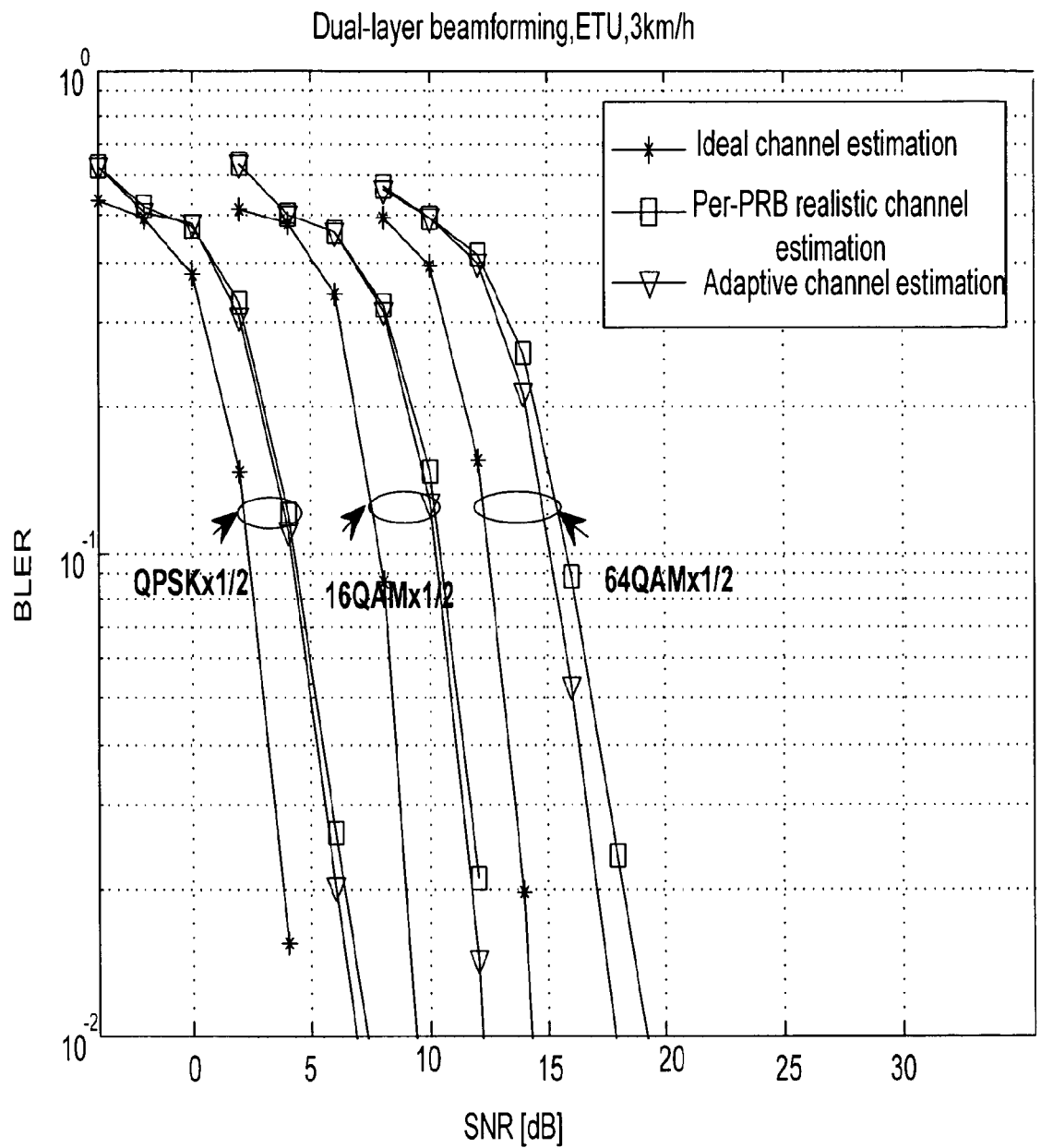
FIG. 8A illustrates, for an exemplary scenario, a performance comparison between ideal channel estimation; per- PRB channel estimation and adaptive channel estimation in accordance with an exemplary of the present invention.
Figure 8B:
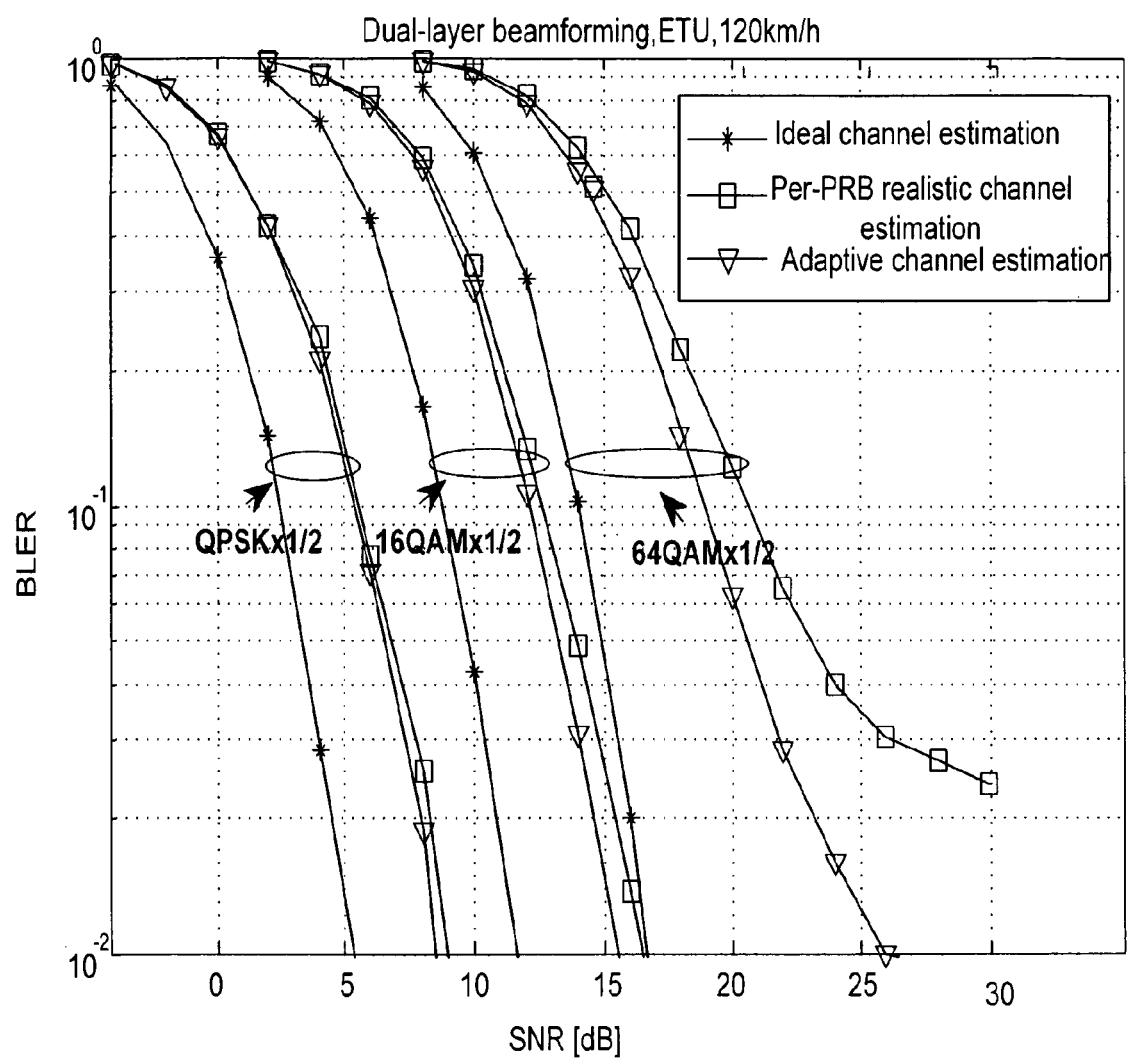
FIG. 8B illustrates, for another exemplary scenario, a performance comparison between ideal channel estimation; per-PRB channel estimation and adaptive channel estimation in accordance with an exemplary of the present invention.

Referring to FIGS. 8A-8B, there are illustrated performance evaluations (i.e. simulations) when adaptive channel estimation (i.e. switching between per-PRB and inter-PRB channel estimations) is performed for dual-layer beamforming under two ETU (Extended Typical Urban) scenarios, the first one (FIG. 8A) where the speed of the UE is 3 km/h, and the second one (FIG. 8B) where the speed of the UE i 120 km/h. The performance of ideal channel estimations is also depicted for the two scenarios. The legends in respective graph indicate which curves relate to ideal channel estimations; which curves relate to a per-PRB realistic channel estimation for the ETU scenario, and which curves relate to adaptive channel estimation for the ETU scenario. The simulations show the BLER (BLock Error Rate) as a function of the SNR (in dB). Throughout the simulations, precoding granularity of 4 PRBs is used. Furthermore, the UE:s channel estimator used is based on the criterion of the minimum mean square error (MMSE) using a 2 dimensional-MMSE filter (2D-MMSE). In addition, 3 modulations schemes are considered: QPSK (Quadrature Phase Shift Keying), 16 QAM (Quadrature Amplitude Modulation) and 64 QAM; and the same coding rate equal to ½ is applied for all modulations schemes. As shown, regardless of the ETU scenario the gap between ideal channel estimation and per-PRB realistic channel estimation is large. The gaps are encircled in FIGS. 8A-8B. The higher the modulation scheme and the higher the mobility or speed of the user equipment, the larger the gap. This is because higher modulation e.g. 64 QAM is more sensitive to channel errors. In the evaluations, the PRB group size was limited to 2 which means that at most two adjacent PRBs can be grouped for inter-PRB channel estimation. Furthermore, a 8×2 MIMO is considered. Adaptive channel estimation is performed according to the previously described exemplary embodiments of the present invention.

The performance results show that adaptive channel estimation clearly improves the performance i.e. it improves demodulation performance, especially for higher modulation scheme e.g. 64 QAM. As shown, in both FIG. 8A and FIG. 8B the curves representing adaptive channel estimations are closer to curves depicting ideal channel estimations regardless of the ETU scenario used and regardless of the modulations scheme used. This means that the adaptive channel estimation in accordance with the exemplary embodiments of the present invention improves demodulation performance compared to prior art static per-PRB channel estimations. For instance, 2 dB gain can be obtained, in case of 64 QAM and 120 km/h ETU scenario, at $10^{-1}$ (i.e. 10%) BLER and the error floor can be efficiently overcome. Thus an advantage with the exemplary embodiments of the present invention wherein adaptive channel estimation (i.e. per-PRB and inter-PRB channel estimation) is performed is that demodulation performance is improved compared to that if only a static per-PRB channel estimation is used. This also means that the channel estimation accuracy is improved. In addition a low complexity implementation is achieved due to distribution of PRBs into several groups based on continuity criterion. Furthermore, the adaptive switching between inter-PRB and per-PRB channel estimation from group to group is achieved without any control signalling from the radio base station. It should be mentioned that the exemplary embodiments of the present invention can be implemented in both codebook and/or non-codebook based systems both in downlink and in uplink, where PRB channel estimation is used.

Figure 9:
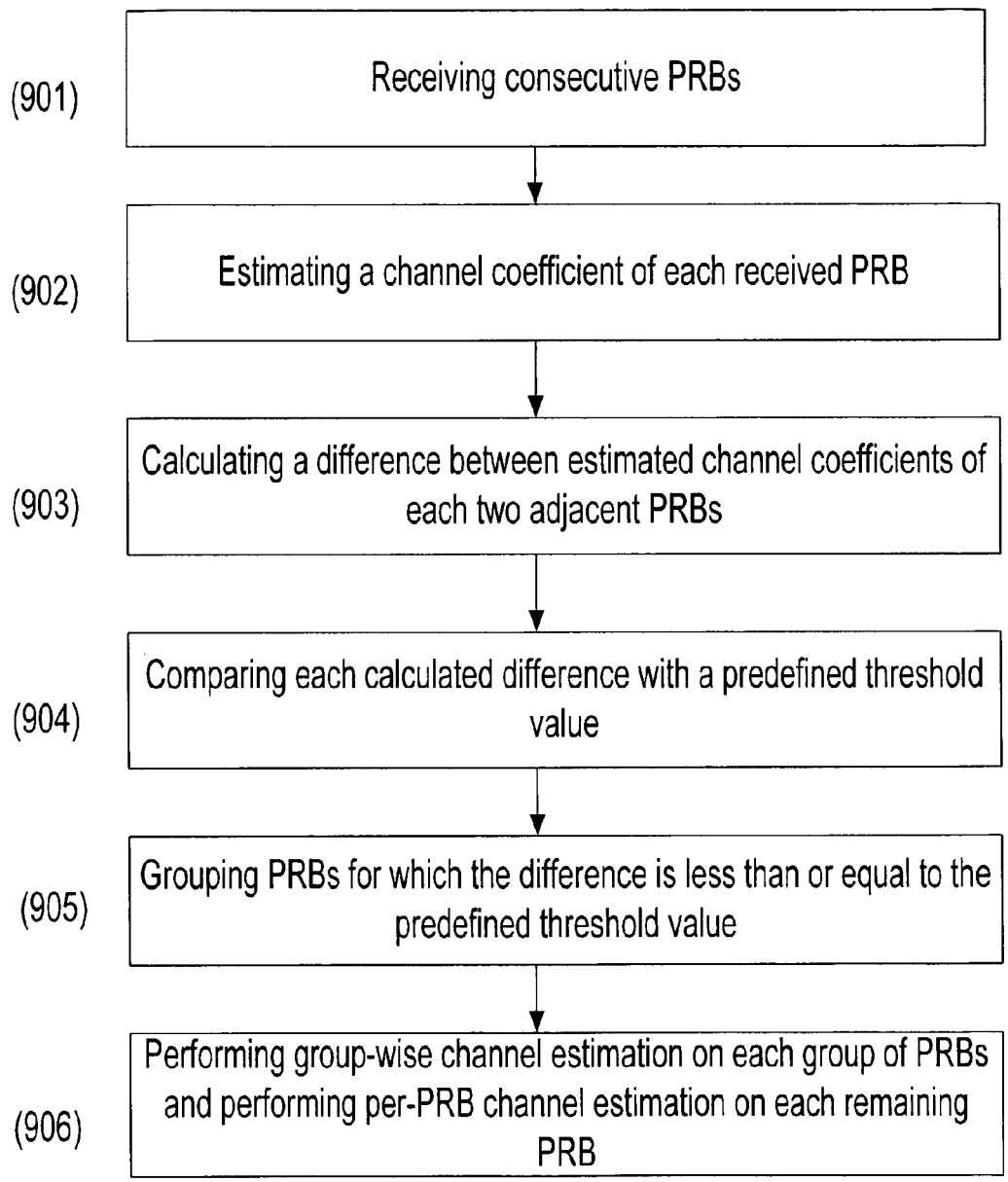
FIG. 9 is a diagram illustrating a flowchart of a method for use in a user equipment, according to exemplary embodiments of the present invention.

FIG. 9 summarizes the main steps of the method/process performed by the user equipment in accordance with the previously described embodiments of the present invention.

As shown, the mains steps comprise:
(901) receiving a plurality of consecutive PRBs from a radio base station;
(902) estimating a channel coefficient of each PRB;
(903) calculating for each two adjacent PRBs, a difference between estimated channel coefficients of the two adjacent PRBs;
(904) comparing each calculated difference with a predefined threshold value;
(905) grouping PRBs for which the difference is less than or equal to the predefined threshold value; and
(906) performing a group-wise (i.e. inter-PRB) channel estimation on a group and performing a per-PRB channel estimation on each remaining PRB.

According to an exemplary embodiment of the present invention, the estimating step, numbered (902) above, comprises, estimating a channel coefficient of each received PRB at each band edge separating consecutive PRBs. Furthermore, the receiving step, numbered (901) above, comprises receiving the consecutive PRBs which are precoded by a non-codebook precoder of the radio base station.

According to a further exemplary embodiment of the present invention, the estimating step, numbered (902) above, comprises estimating a channel coefficient, of each received PRB, the channel coefficient corresponding to a channel state information (CSI) of each received PRB Additional details regarding the functions of the UE have already been thoroughly described in detail and are therefore not repeated again.

The present invention and its embodiments can be realized in many ways. For example, one embodiment of the present invention includes a computer-usable or computer-readable medium comprising a computer program code configured to cause a processor to execute instructions stored on the medium. The executable instructions perform the method step of the present invention as previously described and as presented in the appended method claims.

Note that while the invention has been described in terms of several exemplary embodiments, it is contemplated that alternatives, modifications, permutations and equivalents thereof will become apparent upon reading of the specifications and upon study of the drawings. It is therefore intended that the following appended claims include such alternatives, modifications, permutations and equivalents as fall within the scope of the present invention.

The invention claimed is:

1. A user equipment (UE) configure to perform channel estimation in a wireless communications network system, said UE comprising:
   a receiver circuit configured to receive a plurality of consecutive physical resource blocks from a radio base station;
   a channel estimator configured to estimate a channel coefficient of each received physical resource block;
   a calculator circuit configured to calculate for each two adjacent physical resource blocks, a difference between estimated channel coefficients of the two adjacent physical resource blocks;
   a comparator circuit configured to compare each calculated difference with a predefined threshold value; and
   an assembler circuit configured to group physical resource blocks for which said calculated difference is less than or equal to the predefined threshold value; wherein the channel estimator is further configured to perform a group-wise channel estimation on a group comprising physical resource blocks for which said calculated difference is less than or equal to the predefined threshold and to further perform per physical resource block channel estimation on each remaining physical resource block.

2. The UE of claim 1, wherein the channel estimator is configured to estimate a channel coefficient of each received physical resource block at each band edge separating consecutive physical resource blocks.

3. The UE of claim 1, wherein the receiver is configured to receive physical resource blocks that are precoded by a non-codebook precoder of the radio base station.

4. The UE of claim 1, wherein said channel estimator is configured to estimate a channel coefficient, of each received physical resource block, corresponding to a channel state information of each received physical resource block.

5. The UE of claim 1, wherein each physical resource block that belongs to a group for which said difference is less than or equal the predefined threshold value belongs to a same precoder, whereas the remaining physical resource blocks belong to different precoders.

6. The UE of claim 1, wherein the UE is a MIMO-based UE.

7. A method, in a user equipment (UE), for channel estimation in a wireless communications network system, said method comprising:
   receiving a plurality of consecutive physical resource blocks from a radio base station;
   estimating a channel coefficient of each received physical resource block;
   calculating for each two adjacent physical resource blocks, a difference between estimated channel coefficients of the two adjacent physical resource blocks;

comparing each difference with a predefined threshold value; grouping physical resource blocks for which said difference is less than or equal to the predefined threshold value; and performing a group-wise channel estimation on a group comprising physical resource blocks for which said difference is less than the predefined threshold value and performing per physical resource block channel estimation on each remaining physical resource block.

8. The method of claim 7, wherein said estimating comprises estimating a channel coefficient of each received physical resource block at each band edge separating consecutive physical resource blocks.

9. The method of claim 7, wherein said receiving comprises receiving consecutive physical resource blocks that are precoded by a non-codebook precoder of the radio base station.

10. The method of claim 7, wherein said estimating comprises estimating a channel coefficient, of each received physical resource block, corresponding to a channel state information of each received physical resource block.

11. A non-transitory computer-readable medium comprising computer program code stored thereon, wherein said computer program code is configured to, when executed by a processor, cause the processor to:

estimate a channel coefficient of each of a plurality of consecutive physical resource blocks received from a base station by a receiver associated with said processor;

calculate, for each two adjacent physical resource blocks, a difference between estimated channel coefficients of the two adjacent physical resource blocks;

compare each difference with a predefined threshold value;

group physical resource blocks for which said difference is less than or equal to the predefined threshold value; and perform a group-wise channel estimation on a group comprising physical resource blocks for which said difference is less than the predefined threshold value and perform per physical resource block channel estimation on each remaining physical resource block.

* * * * *

UNITED STATES PATENT AND TRADEMARK OFFICE
CERTIFICATE OF CORRECTION

PATENT NO. : 8,804,563 B2  
APPLICATION NO. : 13/513574  
DATED : August 12, 2014  
INVENTOR(S) : Hu et al.

Page 1 of 1

It is certified that error appears in the above-identified patent and that said Letters Patent is hereby corrected as shown below:

Specification

In Column 3, Line 53, delete "of." and insert -- of --, therefor.

In Column 6, Line 55, delete "$\Delta_1 = |H_2-H_1|_2$;" and insert -- $\Delta_1 = |H_2-H_1|^2$; --, therefor.

Signed and Sealed this  
Seventeenth Day of November, 2015

Michelle K. Lee  
*Director of the United States Patent and Trademark Office*